(12) United States Patent
Bang et al.

(10) Patent No.: US 7,863,551 B2
(45) Date of Patent: Jan. 4, 2011

(54) SYSTEM, METHOD AND MEDIUM TRACKING MOTION OF SUBJECT USING LASER

(75) Inventors: Won-chul Bang, Seongnam-si (KR); Kyu-yong Kim, Yongin-si (KR); Yeun-bae Kim, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 0 days.

(21) Appl. No.: 11/892,535

(22) Filed: Aug. 23, 2007

(65) Prior Publication Data

US 2008/0111054 A1    May 15, 2008

(30) Foreign Application Priority Data

Nov. 14, 2006    (KR) ...................... 10-2006-0112412

(51) Int. Cl.
G01C 21/02    (2006.01)
G01C 21/24    (2006.01)
G01J 1/20    (2006.01)

(52) U.S. Cl. ................. 250/203.1; 250/221; 250/222.1; 340/557; 382/103; 382/117; 382/118

(58) Field of Classification Search ............. 250/201.3, 250/208.1, 221, 222.1, 205; 342/76; 340/555–557; 382/103, 117, 118, 274, 104
See application file for complete search history.

(56) References Cited

U.S. PATENT DOCUMENTS 6,529,625 B2* 3/2003 Sentoku et al. ............. 382/151

7,022,971 B2* 4/2006 Ura et al. ..................... 250/221
2002/0165526 A1* 11/2002 Sumiya et al. ............... 606/10

FOREIGN PATENT DOCUMENTS

JP    63-301697    12/1988

(Continued)

OTHER PUBLICATIONS

Hiroshi Kanasugi, et al., "Measurement of Human Behavior and Identification of Activity Modes by Wearable Sensors", Center for Spatial Information Science, University of Tokyo.

(Continued)

Primary Examiner—Thanh X Luu
Assistant Examiner—Francis M Legasse, Jr.
(74) Attorney, Agent, or Firm—Staas & Halsey LLP

(57) ABSTRACT

A system, method and medium tracks a motion of a subject using a laser by synchronizing an incident axis of the input image with an exit axis of the laser in order to radiate the laser based on an input image. The system includes a half mirror to reflect a predetermined amount of incident light and to transmit a remaining amount of the incident light, an image input unit to input an image reflected from the half mirror, a position identifying unit to identify a position of a first subject included in the input image, and a target tracking unit to track the first subject with reference to the identified position by radiating a laser transmitted through the half mirror onto the first subject along an axis from the half mirror and onto the first subject.

26 Claims, 11 Drawing Sheets

FOREIGN PATENT DOCUMENTS

KR    2003-0037692    5/2003

OTHER PUBLICATIONS

Gil-Man Lee, et al., "A Method of Recognizing and Tracking Hand Movements", Department of Computer Engineering, Pusan National University of Korea Institute of Footwear and Leather Technology.

Gil-Man Lee, et al., "Hand Gesture Recognition and Tracking under Natural Environment", Department of Computer Engineering, Pusan National University of Korea Institute of Footwear and Leather Technology.

Hwayung Kwon, et al., "Hand Region Segmentation and Tracking Based on Hue Image", School of Electrical and Computer Engineering, Sungkyunkwan University.

* cited by examiner

SYSTEM, METHOD AND MEDIUM TRACKING MOTION OF SUBJECT USING LASER

CROSS-REFERENCE TO RELATED APPLICATIONS

This application claims priority from Korean Patent Application No. 10-2006-0112412 filed on Nov. 14, 2006 in the Korean Intellectual Property Office, the disclosure of which is incorporated herein by reference in its entirety.

BACKGROUND

1. Field

One or more embodiments of the present invention relate to a system, method and medium tracking motion of a subject, and more particularly, to a system, method and medium tracking motion of a subject using a laser by synchronizing an incident axis of the input image with an exit axis of the laser in order to radiate the laser based on an input image.

2. Description of the Related Art

A related art infrared transceiver module, which is incorporated into a variety of communication and digital apparatuses, can, process signals to transceive data wirelessly in local areas. With the advent of the related art infrared transceiver module, remote control technology has been applied to related art peripheral devices such as television (TV) sets and video cassette recorders (VCRS). Further, this technology has been extensively applied to electronic systems for industrial purposes, such as interactive TVs, notebook computers, personal computers (PCs), digital cameras and mobile communication terminals. As such, related art remote control devices are utilized extensively.

In order to enhance user convenience, most existing home/office electrical or electronic devices are remotely controllable, so that a user located a predetermined distance from a device to be controlled can remotely control the power supply of the device or can execute a particular function, using buttons provided on a remote control.

Along with the widespread use of related art remote controls, most related art audio and video devices are packaged with remote controls included therein. Accordingly, an integrated remote control to control a plurality of peripheral devices using an integrated unit has been introduced.

As described above, use of remote controls has enabled a user to remotely control a device without requiring the user to be located close to the device. However, a user may be inconvenienced if the remote control is lost or malfunctions.

Accordingly, the inventors of the present invention desire to develop technologies for standalone devices to make the devices operable without assistance from an external device, such as a remote control, while causing minimum inconvenience to a user.

SUMMARY

One or more embodiments present invention provide a system, method and medium tracking a motion of a subject using a laser by synchronizing an incident axis of the input image with an exit axis of the laser in order to radiate the laser based on an input image.

One or more embodiments of the present invention also provide a system, method and medium tracking a motion of a subject, which can prevent a laser from being radiated on a body part that is sensitive to light, e.g., a user's eyes, the light sensitive body part being identified by a camera, an IF diode or an IR camera.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a motion tracking system including, a half mirror to reflect a predetermined amount of incident light and to transmit a remaining amount of the incident light, an image input unit to input an image reflected from the half mirror, a position identifying unit to identify a position of a first subject included in the input image, and a target tracking unit to track the first subject with reference to the identified position by radiating a laser transmitted through the half mirror onto the first subject along an axis from the half mirror and onto the first subject.

To achieve at least the above and/or other aspects and advantages, embodiments of the present invention include a motion tracking method including receiving an input image reflected from a predetermined half mirror, which reflects a predetermined amount of incident light and transmits a remaining amount of the incident light, identifying a position of a first subject included in the input image, and tracking the first subject with reference to the identified position by radiating a laser transmitted through the half mirror onto the first subject along an axis from the half mirror and onto the first subject.

To achieve at least the above and/or other aspects and advantages, embodiments of the present invention include a method tracking motion of a user, the method including, defining a first region and a second region of the user, and scanning the user with a beam of a laser, including the first region and the second region, to locate and track a first subject located within the first region while changing an output of the laser while the beam of the laser falls within the second region.

To achieve at least the above and/or other aspects and advantages, embodiments of the present invention include a system tracking motion of a user, the system including, a position identifying unit to define a first region and a second region of the user, and a target tracking unit to scan the user, including the first region and the second region, with a beam of a laser to locate and track a first subject located within the first region, while changing an output of the laser while the beam of the laser falls within the second region.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1:
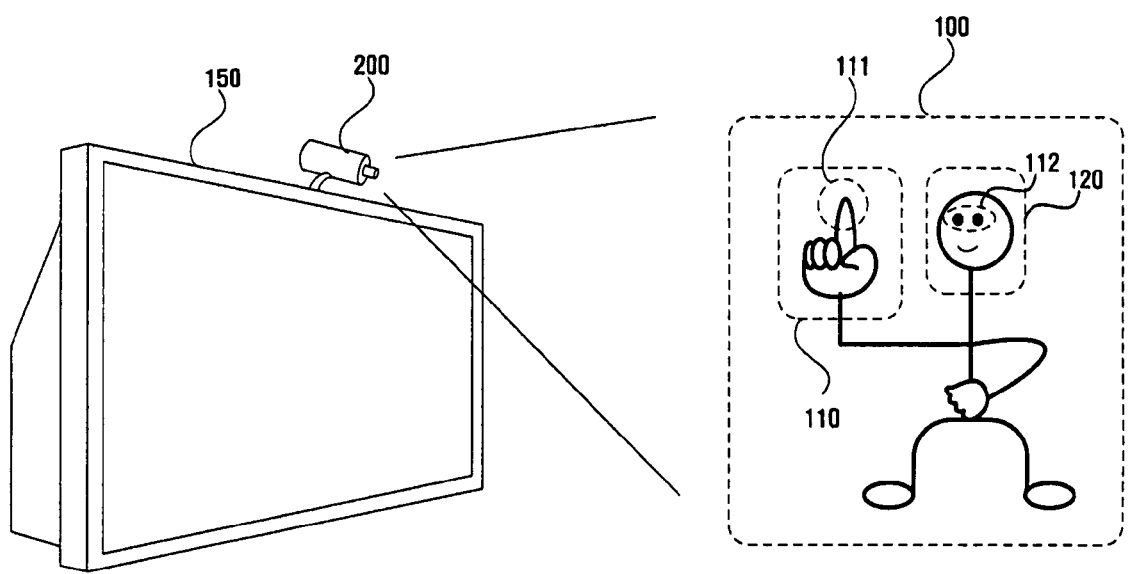
FIG. 1 illustrates a system tracking a user's motion; according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

FIG. 1 illustrates a system 200 for tracking a user's motion, according to an embodiment of the present invention.

The system 200 tracking a user's motion (hereinafter, to be abbreviated as a motion tracking system) may be connected to a system 150 for executing a predetermined function (hereinafter, to be abbreviated as a function executing system). The motion tracking system 200 may recognize a user's motion and transmit a function signal corresponding to the recognized motion to the function executing system 150 to allow the function executing system 150 to execute the predetermined function.

To this end, the motion tracking system 200 may first identify a user's position. In order to identify the user's position, included in an input image 100, the motion tracking system 200 may include an image input unit and an image processing unit for processing the input image 100. Based on the identified user's position, the motion tracking system 200 may scan a predetermined region 110 (hereinafter, to be referred to as a first region). The scanning may be performed to sense a target to be tracked, which is to be referred to as a first subject 111, hereinafter. For example, as shown in FIG. 1, scanning may be performed on the first region 110, for example, a region to the right of a user's face.

Here, the scanning of the first region 110 may be performed using a laser. That is, the motion tracking system 200 may sense the first subject 111 by sequentially radiating a laser over an entire surface of the first region 110. Referring again to FIG. 1, the first subject 111 may be, for example, the index finger of the user's right hand. When the index finger of the user's right hand is sensed, the motion tracking system 200 may consider the index finger as the first subject 111, for example. Alternatively, the motion tracking system 200 may consider a projecting portion of an object present in the first region 110 as the first subject 111. As an example, the motion tracking system 200 may equally consider an object such as a ball-point pen or a coin rather than part of a user's body as the first subject 111.

As the position of the first subject 111 is identified, the motion tracking system 200 may perform tracking of the first subject 111. That is to say, the motion tracking system 200 may radiate a laser onto the first subject 111. Once the position of the first subject 111 is identified and the user moves the first subject 111, the motion tracking system 200 may change a radiation path of a laser according to the motion of the first subject 111 to allow the laser to be continuously radiated onto the first subject 111. Tracking of the motion of the first subject 111 may be performed by receiving and analyzing diffused beams of laser radiated onto the first subject 111.

While the motion tracking system 200 tracks the motion of the first subject 111 using the laser, light from the laser may potentially be radiated onto part of a user's body that is sensitive to light, e.g., a user's eyes, in response to an unintentional or unexpected movement by the user.

Light may be classified into light having little adverse effect on the human body and light having seriously adverse effect on the human body. Nonetheless, certain parts of the human body may be severely affected by laser light normally having little adverse effect after an extended exposure time to the laser. Accordingly, it is desirable that no laser be radiated on a body part that is sensitive to light, e.g., a user's eyes.

As described above, in order to prevent a laser from being radiated onto a particular part of a user's body, referred to as a second subject 112, hereinafter, the motion tracking system 200 may determine a predetermined region where the second subject 112 may be positioned, which is hereinafter referred to as a second region 120, to identify the user's position. For example, the motion tracking system 200 may determine the vicinity of a user's face as the second region 120, as shown in FIG. 1.

Here, the second region 120 may refer to a region covering a particular region around or including the second subject 112. For example, where the second subject 112 is a user's eye, the second region 120 may be a predetermined region based on a user's eye (e.g., a left eye or a right eye).

Accordingly, when a laser radiated spot falls inside the second region 120, the motion tracking system 200 may restrict generation of the laser or control the radiation path of the laser so as not to adversely affect the body part, e.g., the eyes, while still performing tracking of the first subject 111.

Figure 2:
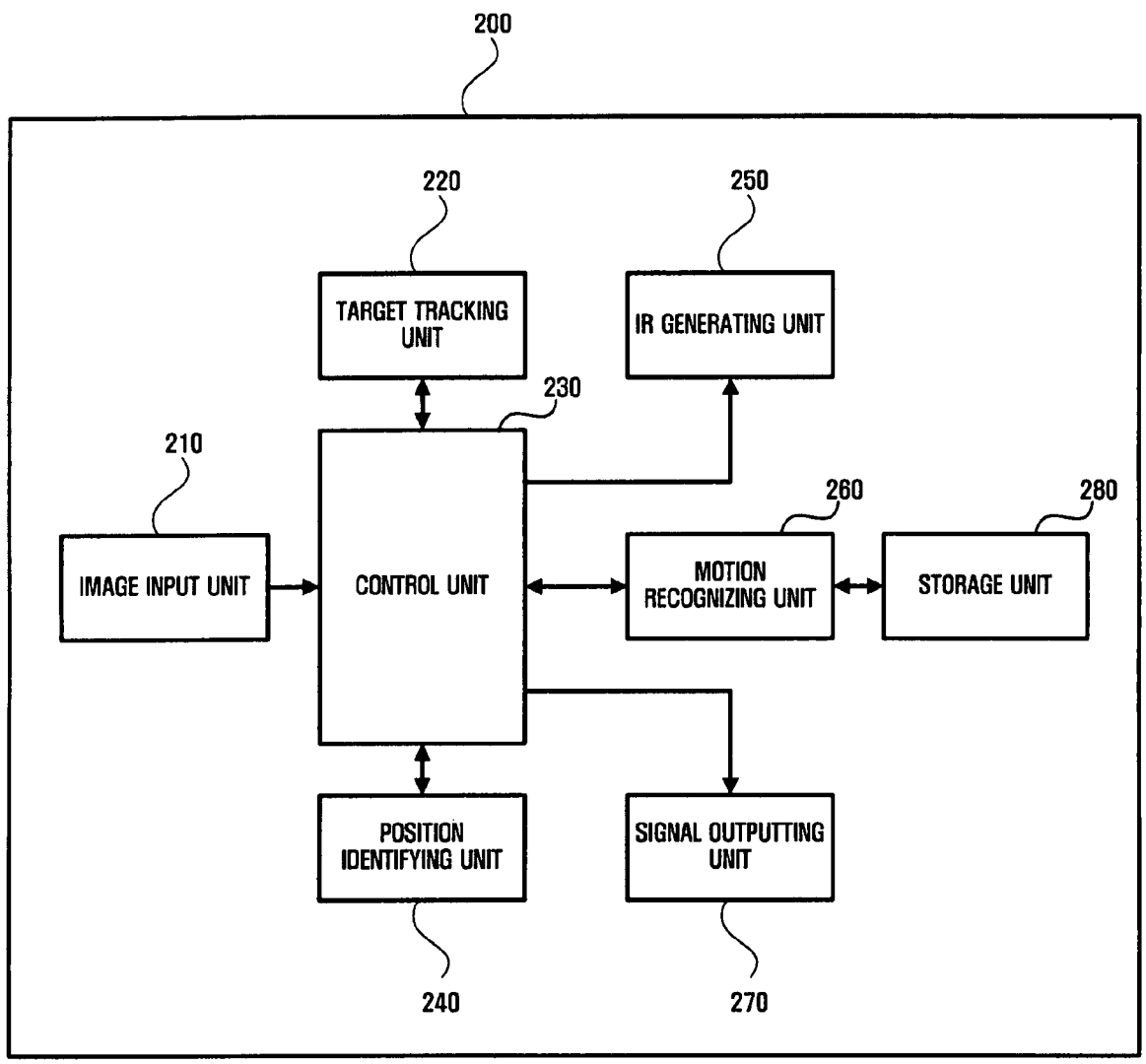
FIG. 2 illustrates a motion tracking system, according to an embodiment of the present invention.

FIG. 2 illustrates a motion tracking system (200), according to an embodiment of the present invention.

The motion tracking system 200 may include, for example, an image input unit 210, a target tracking unit 220, a control unit 230, a position identifying unit 240, an infrared (IR) generating unit 250, a motion recognizing unit 260, a signal outputting unit 270, and a storage unit 280.

The image input unit 210 may receive an image, e.g., an analog image. In order to receive the image, the image input unit 210 may include an image sensing device. Examples of the image sensing device include a CCD (Charge-Coupled Device), a CIS (CMOS Image Sensor), and so on.

In addition, the image input unit 210 may amplify an input image signal by a predetermined amount by controlling a gain of the input image signal, thereby facilitating image signal processing in a subsequent operation. Alternatively, the image input unit 210 may include a predetermined conversion unit (not shown) to digitally convert the amplified analog image signal.

Meanwhile, in an embodiment, a region of the image input to the image input unit 210 may be preferably larger than a laser tracking region produced by the target tracking unit 220, which will be described in greater detail below. This is because even if a target is a part of the input image, the target located within the area of the laser tracking region may be tracked by the target tracking unit 220.

The position identifying unit 240 may identify a user's position included in the input image. Here, the position identifying unit 240 may identify the user's position by processing the digital image sent from the image input unit 210 through edge detection, pattern recognition, or the like.

In one or more embodiments of the present invention, an approximate position of the user, as identified by the position identifying unit 240, may be used. Accordingly, the position identifying unit 240 may regard a still user, instead of a moving user, as a target, and may perform position identification on the still user. In other words, the position identifying unit 240 may perform position identification of one among a plurality of frames transmitted from the image input unit 210, e.g., a still image, rather than all of the frames transmitted from the image input unit 210. Of course, with sufficient computation capability, the position identifying unit 240 may perform position identification on images contained in all input frames, e.g., a moving image.

After identifying the user's position, the position identifying unit 240 may identify positions of the first region 110 and the second region 120. That is to say, the position identifying unit 240 may identify positions of the first region 110, in which the first subject 111 is expected to be located, and the second region 120, in which the second subject 112 is expected to be located, based on the identified user's position.

In order to identify the position of the second region 120, the position identifying unit 240 may perform image processing on the input image. Alternatively, the position identifying unit 240 may use a position of a second subject 112, formed by reflecting the generated IF radiation in identifying the position of the second region 120, which will be described in greater detail later with reference to FIG. 8.

When the user's position and the positions of the first region 110 and the second region 120 are identified, the position identifying unit 240 may transmit the identified positions to the control unit 230 and stop performing a position identification task.

Meanwhile, in contrast to the position identifying unit 240 that identifies the approximate user's position, the target tracking unit 220, which will be described in greater detail below, continuously tracks the first subject 111. In an example where the target tracking unit 220 cannot perform tracking properly, e.g., where the user moves to a position outside a viewing angle of the image input unit 210, or where the first subject 111 is shielded by the user or another object, the position identifying unit 240 may resume the position identification task. That is, the control unit 230 may be continuously notified of tracking results for the first subject 111 by the target tracking unit 220. If the control unit 230 is notified by the target tracking unit 220 that the first subject 111 cannot be tracked, the control unit 230 may allow the position identifying unit 240 to resume the position identification task.

Figure 3:
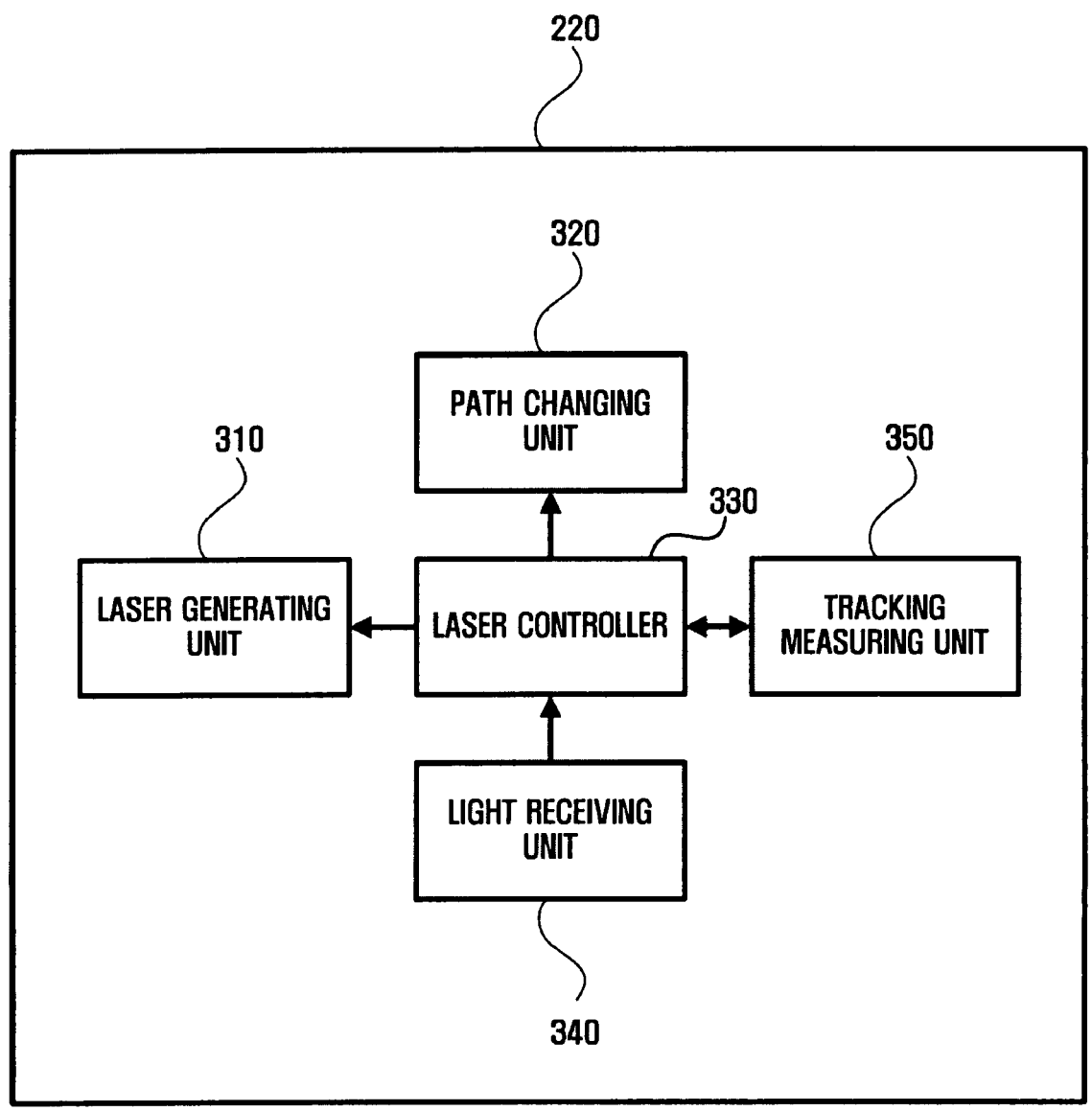
FIG. 3 illustrates a subject tracking unit shown in FIG. 2; according to an embodiment of the present invention.

The target tracking unit 220 may track the first subject 111. The tracking performed by the target tracking unit 220 may include tracking of a moving target. For this purpose, the target tracking unit 220 may include at least one of a laser generating unit 310, a path changing unit 320, a laser controller 330, a light receiving unit 340, and a track measuring unit 350, as shown in FIG. 3.

The laser generating unit 310 may generate a laser. The laser generated by the laser generating unit 310 may be, in an embodiment, one radiated in a predetermined circular shape having a predetermined radius, rather than one radiated in one direction in a straight line shape. The radiated laser may be reflected back to the subject, and in the process of being reflected, may be diffused. The diffused beam may be received, e.g., at the light receiving unit 340. As described above, if the subject moves while the circular-shaped laser is radiated, the shape of the diffused beam may vary. Here, the shape of the diffused beam may be used in sensing the moving direction of the target.

Figure 4:
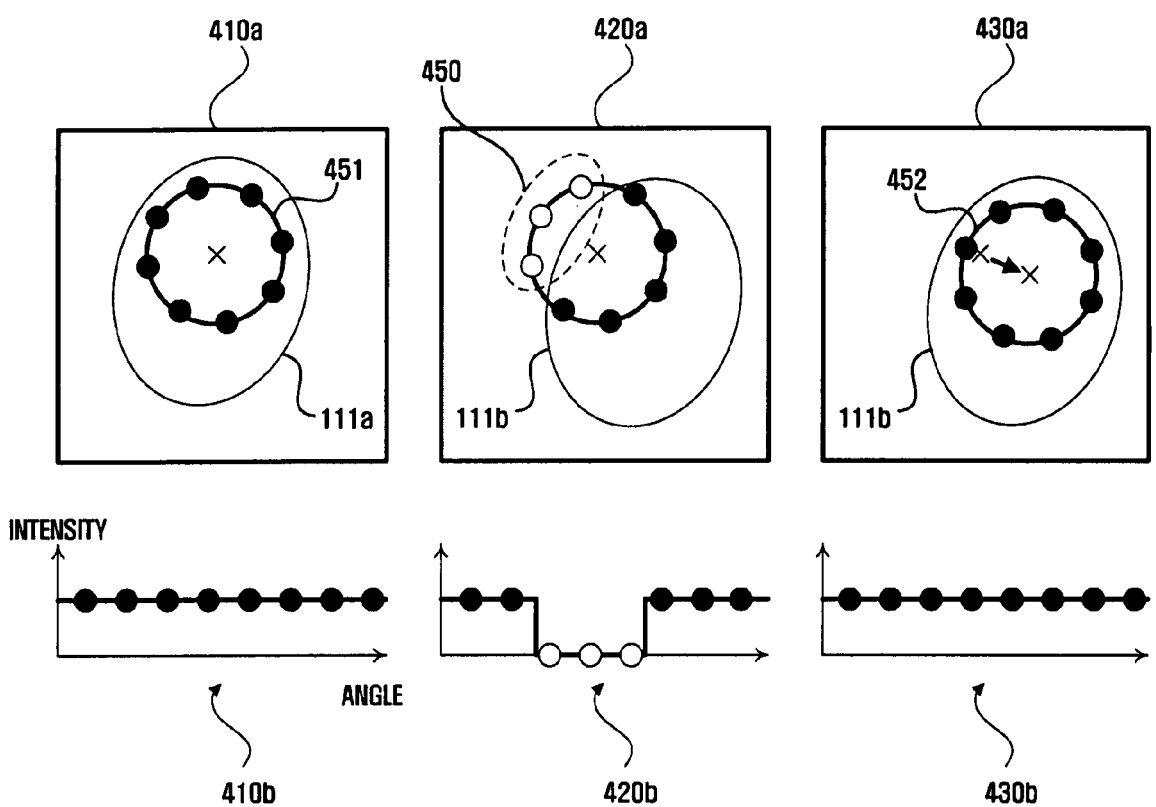
FIG. 4 illustrates sensing and tracking of a first subject's motion, according to an embodiment of the present invention.

FIG. 4 illustrates sensing and tracking of a first subject's motion, according to an embodiment of the present invention.

In FIG. 4, reference mark 410*a* may indicate a diagram showing that circular laser beams 451 are radiated onto the first subject 111*a*. Here, the circular laser beams 451 may all be located, for example, within the area of the first subject 111*a*. The radiated laser beams may be reflected and diffused by the first subject 111*a*. The light receiving unit 340 may receive the diffused beams, as indicated by the diagram 410*b*. That is to say, since the circular laser beams 451 may all be located within the area of the first subject 111*a*, the intensities of the diffused beams may all remain at the same level.

Reference mark 420*a* may indicate a diagram showing a motion of the first subject 111*b*, in which some 450 of the circular laser beams 451 may be radiated outside the area of the first subject 111*b*. Accordingly, the intensities of the diffused beams between the outside and inside of the first subject 111*b* may be different from each other, as indicated by reference mark 420*b*.

When the diffused beam intensities are detected, as shown by the diagram 420*b*, the laser controller 330 may control the path changing unit 320 to change the radiation path of the laser. That is to say, the path changing unit 320 may change the radiation paths so that they are opposite to the radiation paths of each of some 450 of the circular laser beams 451, which are radiated outside the first subject 111*b*. As a result, the circular laser beams 452 may all be located within the area of the first subject 111*b*, as indicated by reference mark 430*a*, and the intensities of the diffused beams may all remain at the same level.

The laser controller 330 may control the path changing unit 320 to change the radiation path of the laser, e.g., by identifying the position of the first subject 111 in a 3-dimensional space using a change in the diffused beam intensities and the overall intensity of the incident diffused beams. The sizes of circles in the circular laser beams may be varied according to the distance between the motion tracking system 200 and the first subject 111. The laser controller 330 may control the sizes of the circles by referring to the distance between the motion tracking system 200 and the first subject 111, for example.

In an embodiment where the first subject 111 is shielded by the user or another object, or the first subject 111 moves outside a laser tracking region in which laser tracking can be performed by the path changing unit 320, the intensities of the diffused beams incident on the light receiving unit 340 may be reduced. When the intensities of the incident beams fall below a predetermined threshold, it may be determined that the first subject 111 cannot be tracked and the determination result may be transmitted to the control unit 230. Accordingly, the control unit 230 may control the position identifying unit 240 to resume the task of identifying a user's position and the positions of the first region 110 and second region 120.

Referring back to FIG. 3, the path changing unit 320 may change the radiation path of laser. For this purpose, the path changing unit 320 may include a reflection mirror unit reflecting laser beams generated by the laser generating unit 310, and a driver unit adjusting the placement angle of the reflection mirror unit.

Figure 5:
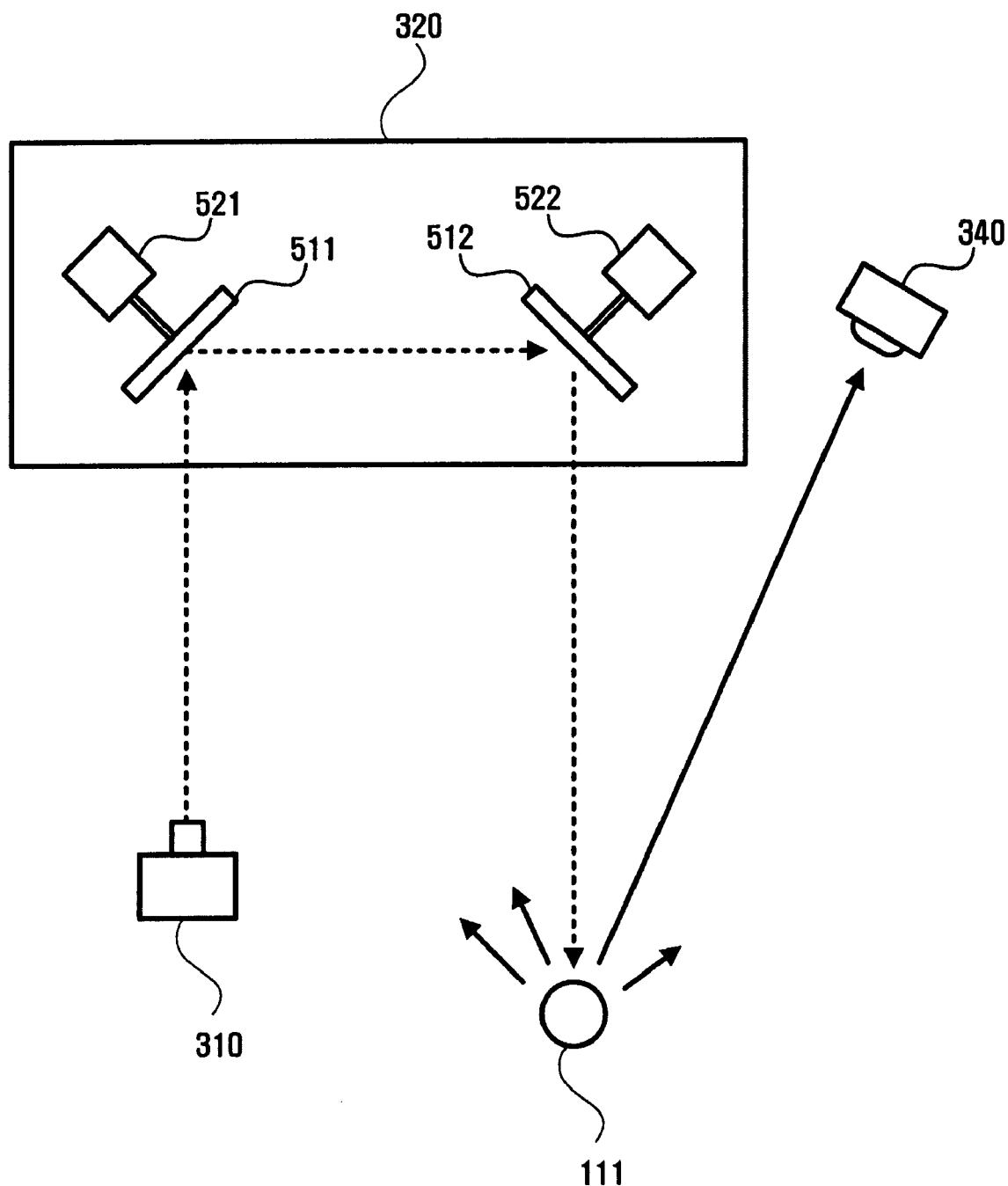
FIG. 5 illustrates changing of a laser radiation path, according to an embodiment of the present invention.

FIG. 5 illustrates changing of a laser radiation path according to an embodiment of the present invention, in which angles of two reflection mirrors 511 and 512, e.g., a vertical reflection mirror and a horizontal reflection mirror, provided in the path changing unit 320, may be minutely changed by drivers 521 and 522, respectively, so that the radiation path of the laser generated by the laser generating unit 310 may be changed. In this way, the above-described circular laser beams may be achieved, for example, by a minute change in the angles of the vertical reflection mirror 511 and the horizontal reflection mirror 512.

The laser radiated from the path changing unit 320 may be transmitted to and reflected from the first subject 111, and in the process of being reflected may be diffused, and the diffused beams may be transmitted to the light receiving unit 340.

While FIG. 5 shows that the radiation path of laser may be changed by two reflection mirrors 511 and 512 and two drivers 521 and 522, one or more embodiments of the present invention may also be applied to an example where three or more reflection mirrors and three or more drivers are used. In an alternative embodiment of the present invention, the radiation path of the laser may also be changed by controlling a single reflection mirror using a single driver, whose angles may be altered in vertical and horizontal directions.

As described above, the tracking of the first subject 111 using the laser may be performed on the image input to the image input unit 210. In this regard, in an embodiment, the image entry direction of the image input unit 210 and the laser radiation direction of the path changing unit 320 are preferably parallel with each other to avoid a region sensing error due to a difference between the image entry direction and the laser radiation direction, for example.

Figure 6:
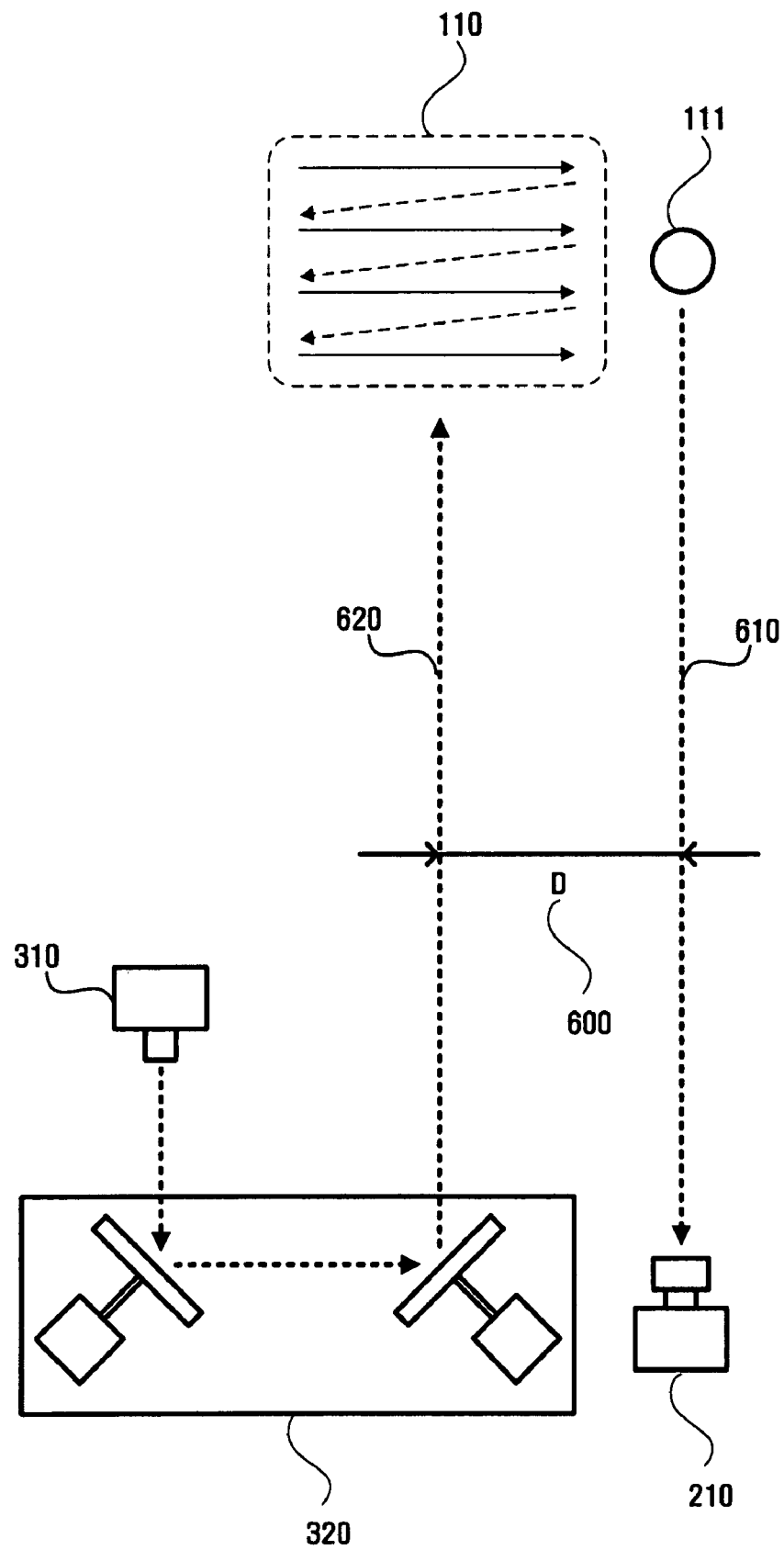
FIG. 6 illustrates a relationship between an image entry direction and a laser radiation direction, according to an embodiment of the present invention.

FIG. 6 illustrates a relationship between an image entry direction and a laser radiation direction, according to an embodiment of the present invention, in which an error in tracking the first subject 111 may be generated due to a distance D 600 between a center axis 610 along the image entry direction and a center axis 620 along the laser radiation direction.

That is to say, where the first subject 111 is located in the entry direction through the image input unit 210, the path changing unit 320 may perform scanning based on the center axis 620 along the laser radiation direction. In an embodiment, if the distance D 600 between the center axis 610 along the image entry direction and the center axis 620 along the laser radiation direction is relatively large, the first subject 111 recognized by the path changing unit 320 may not exist in the first region 110.

Thus, in an embodiment, the center axis 610 along the image entry direction and the center axis 620 along the laser radiation direction may be preferably, parallel with each other and the distance D 600 there between may preferably be as small as possible. That is to say, the center axis 610 along the image entry direction may preferably coincide with the center axis 620 along the laser radiation direction. Since in an embodiment, the image input unit 210 and the laser generating unit 310 may not be disposed at the same physical location, they should be disposed at different locations while making the center axis 610 and the center axis 620 coincide with each other.

Figure 7:
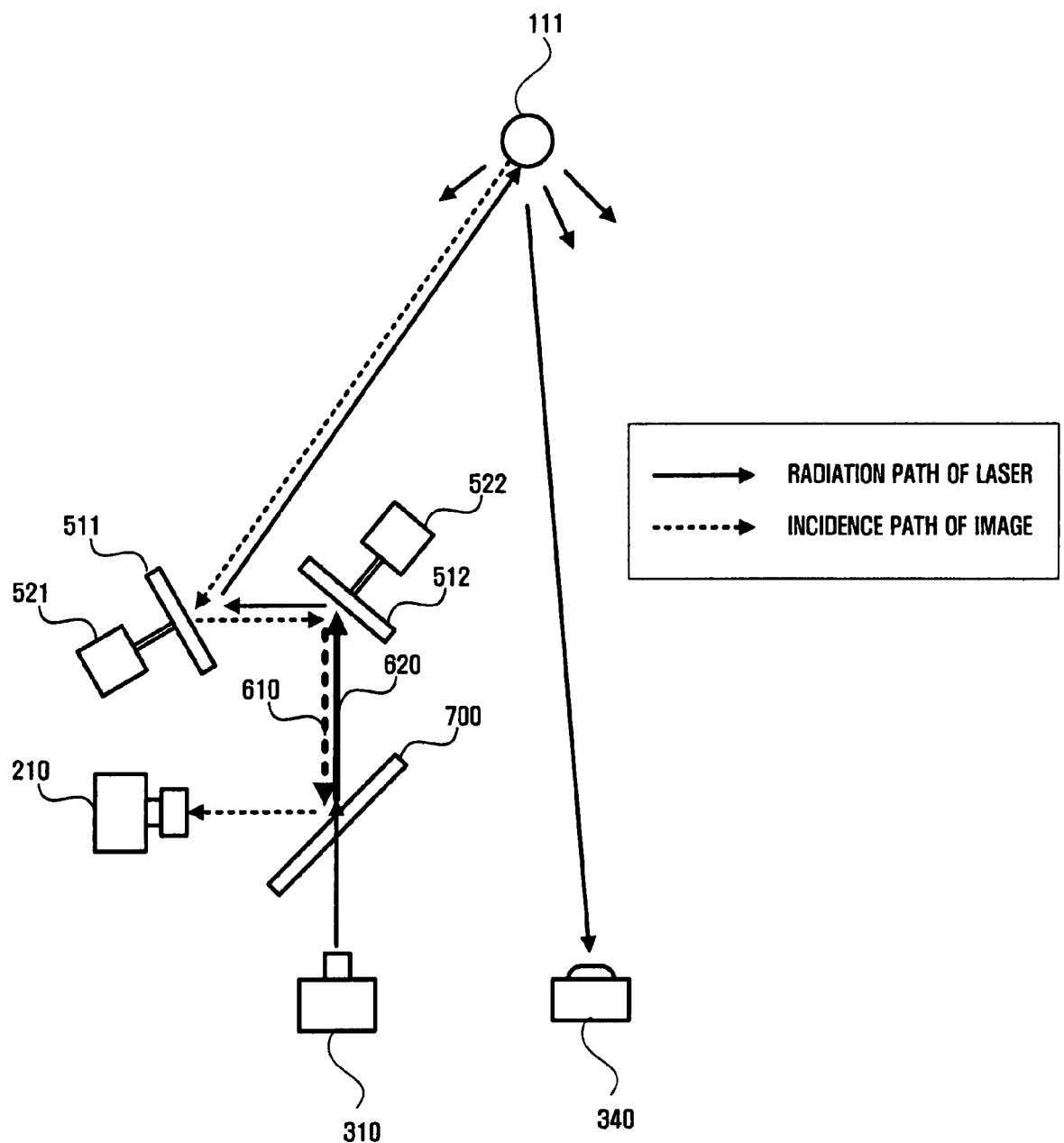
FIG. 7 illustrates aligning of a center axis of an image entry direction with a center axis of a laser radiation direction, according to an embodiment of the present invention.

FIG. 7 illustrates the aligning of a center axis of an image entry direction with a center axis of a laser radiation direction, according to an embodiment of the present invention, in which the center axis 610 along the image entry direction may be aligned with the center axis 620 using a half mirror 700.

In other words, the image input unit 210 may receive a reflected image that is sent from the reflection mirrors 511 and 512 and the half mirror 700 of the path changing unit 320, instead of directly receiving the image of the first subject 111. The laser generated by the laser generating unit 310 may pass through the half mirror 700 and may then be sent to the reflection mirrors 511 and 512.

With this structure, the center axis 610 along the image entry direction may coincide with the center axis 620 along the laser radiation direction.

Here, the half mirror 700 may reflect a predetermined amount of incident light and transmit the remaining amount of the incident light. Reflectivity and transmissivity of the half mirror 700 may vary depending on the direction at which light enters. For example, the transmissivity of the half mirror 700 may be higher than the reflectivity thereof in a laser radiation direction, while the reflectivity of the half mirror 700 may be higher than the transmissivity thereof in an image entry direction.

Referring back to FIG. 3, the laser controller 330 may identify the position of the first subject 111 located in the first region 110 by scanning with the laser. That is to say, the laser controller 330 may control the path changing unit 320 to change the radiation path of the laser to perform scanning on the first region 110, and identify the position of the first subject 111 by referring to the scanning result. Here, the scanning may be performed by sequentially radiating the laser over an entire surface of the first region 110 and receiving diffused beams accordingly.

The first subject 111 identified by scanning may be a projecting portion of a user's body located in the first region 110, e.g., a finger or thumb, or an object having a particular shape, which object may be connected to the user's body.

In addition, the first subject 111 may comprise at least one part of a user's body to which a precendent may be assigned. For example, where the order of precedence is the index finger of the right hand, the index finger of the left hand, the thumb of the right hand, and the thumb of the left hand, the laser controller 330 may first determine whether or not the index finger of the right finger is detected and, if not, detect the index finger of the left finger. The detecting step may be performed on all parts of the body to which a predetermined precedence level has been given.

As described above, the position identifying unit 240 may identify not only the position of the first region 110 but also the position of the second region 120. The laser controller 330 may control the radiation path of the laser by referring to the positions of the first and second regions 110 and 120, so as not to radiate the laser into the second region 120. In a case where the laser is radiated into the second region 120, the laser controller 330 may restrict the generation of the laser so as to avoid harming the user.

That is to say, the laser controller 330 may control the path changing unit 320 and the laser generating unit 310, for example, to change the radiation path of the laser, or to restrict generation of the laser. Accordingly, radiation of the laser into the second subject 112, e.g., a user's eye, which is a region on which laser radiation is not desired, may be avoided. Here, the second region 120 may be set to at least one part or portion of the body.

In order to identify the position of the second region 120, the motion tracking system 200 may use IF radiation, for example.

Figure 8:
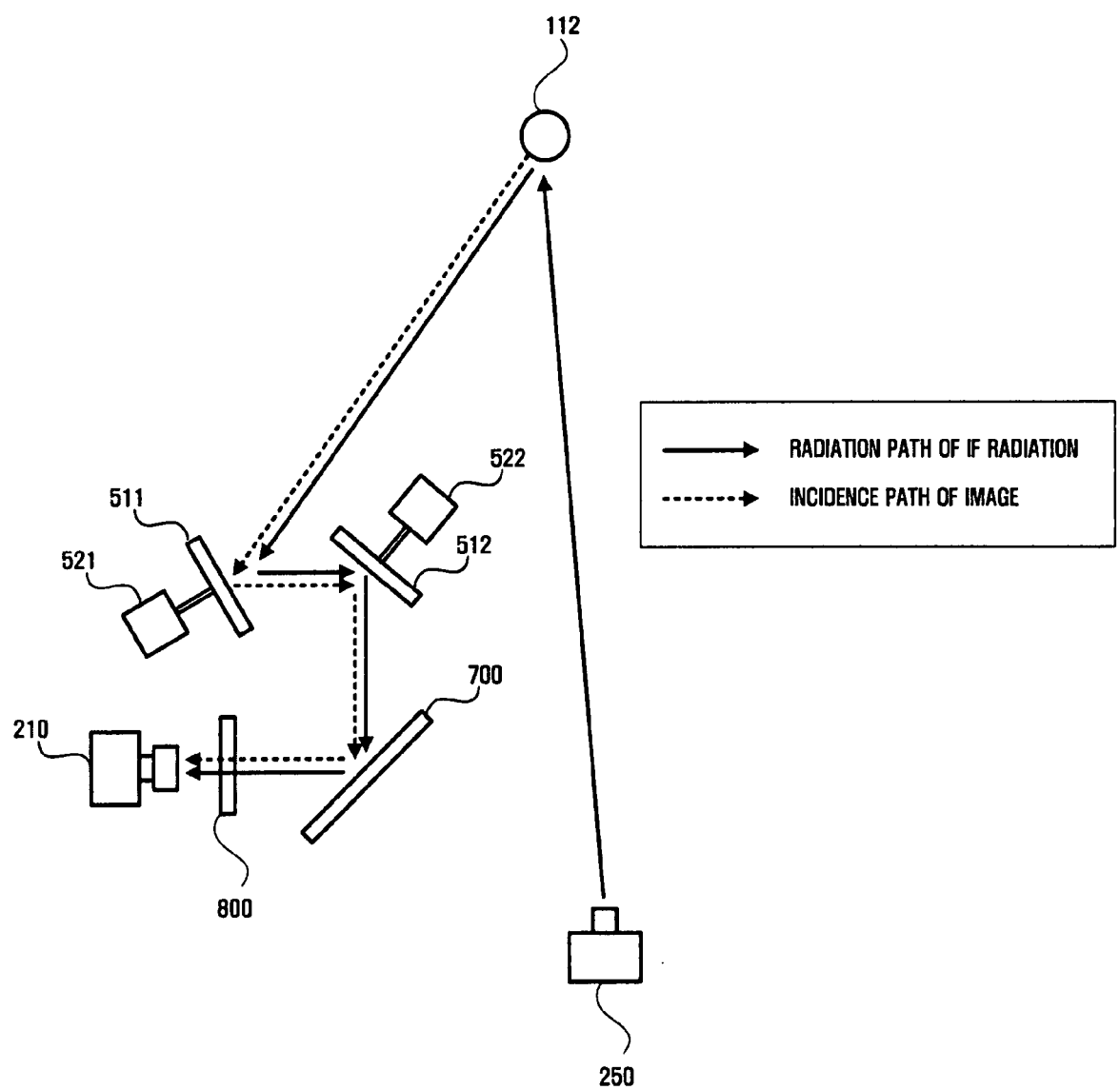
FIG. 8 illustrates that a position of a second region is identified using an infrared ray, according to an embodiment of the present invention.

FIG. 8 illustrates that a position of a second region may be identified using infrared (IF) radiation, according to an embodiment of the present invention. In an embodiment, IF radiation generated by an IR generating unit 250 may be reflected from the second subject 112, incident on the reflection mirrors 511 and 512 of the path changing unit 320, and reflected by the half mirror 700, and finally may be incident on the image input unit 210. That is to say, the incidence path of an image input to the image input unit 210 may be aligned with the incidence path of the IF radiation. Accordingly, the position identifying unit 240 simultaneously may receive the image of the second subject 112 and the IF radiation reflected by the second subject 112, thereby identifying the position of the second region 120.

Since the user's eye may effectively reflect the IF radiation, it may be used in identifying the position of the second region 120. That is to say, among all of the parts of a user's body, the user's eye may be the most sensitive to laser. In an embodiment in which IF radiation is radiated onto a user, the reflectivity may be highest from the user's eye. The location of the eyes may be determined based on the location of the greatest reflected IF radiation.

In addition, since using reflected IF radiation may be more advantageous than using image processing, such as face recognition, in view of computation speed, the position of the second region 120 may be preferably identified in an embodiment using IF radiation.

In order to receive the IF radiation reflected by the second subject 112, the image input unit 210 may include an IR filter 800.

Referring back to FIG. 3, the track measuring unit 350 may measure a track of the changed radiation path of the laser. The radiation path of the laser may be changed by the path changing unit 320. That is to say, the track measuring unit 350 may measure the shape of a motion of the first subject 111, which is basic data for the motion recognizing unit 260, as will be described in greater detail below. Here, the track measuring unit 350 may measure a 3D track of the first subject 111 using the intensity of light incident on the light receiving unit 340 and a rotation angle of at least one reflection mirror included in the path changing unit 320.

Referring back to FIG. 2, the motion recognizing unit 260 may recognize a motion of the first subject 111 using the track transferred from the track measuring unit 350. That is to say, the motion recognizing unit 260 may analyze characteristics of the transferred track, and compare the analyzed track characteristics with a motion code stored, e.g., in the storage unit 280, to extract a function signal corresponding to the motion code stored therein. To this end, the storage unit 280 may have one or more motion codes and function codes corresponding to the one or more motion codes, stored therein, respectively.

Here, the function signals may be signals generated to execute predetermined functions of the function executing system 150. For example, in a case where the function executing system 150 is a TV set, the function signals may be signals for power control, channel switching, volume control, and so on.

The signal outputting unit 270 may output the function signals. The outputted signals may be transferred to the function executing system 150. Accordingly, the function executing system 150 may execute corresponding functions.

Figure 9:
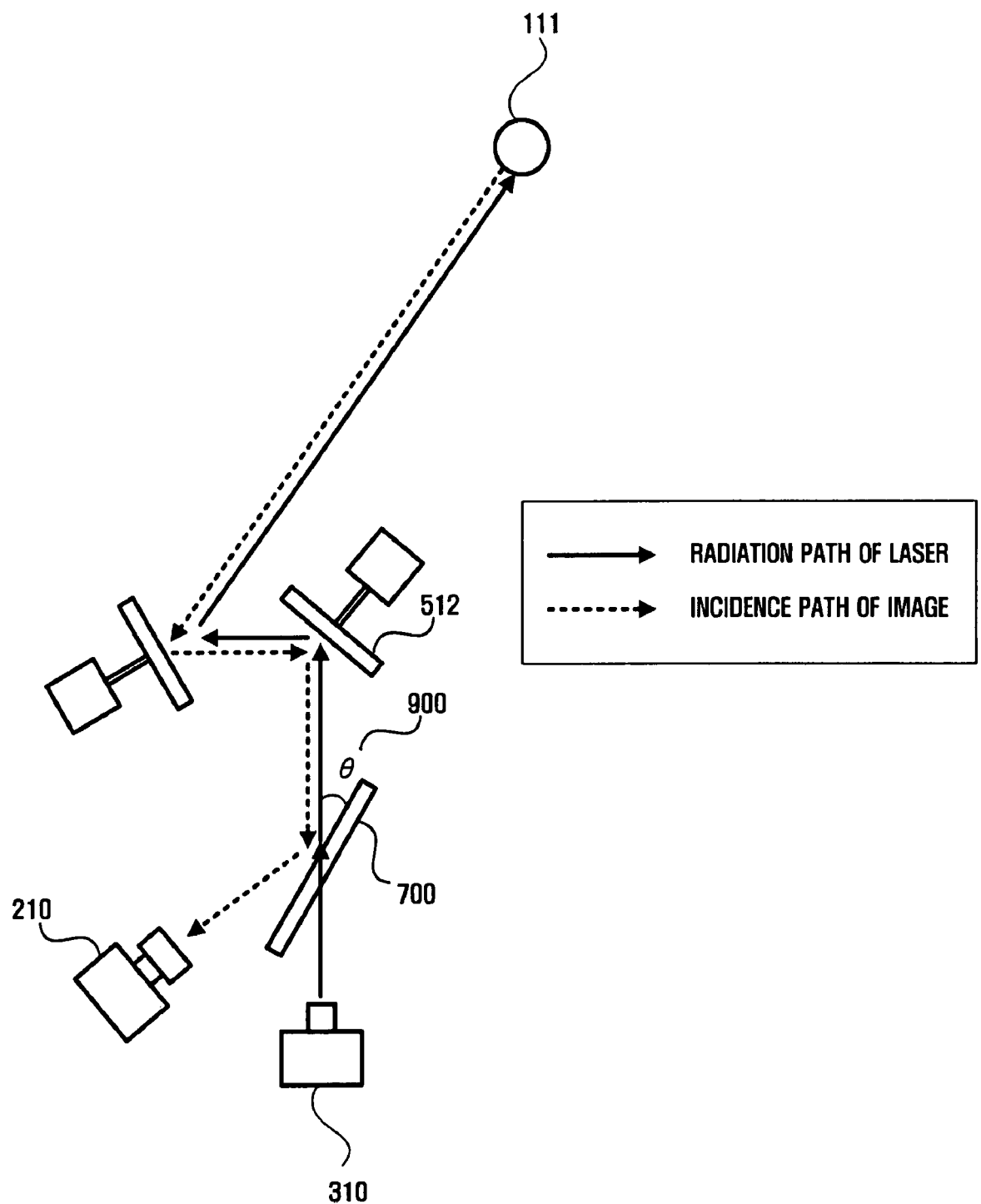
FIG. 9 illustrates aligning of a center axis of an image entry direction with a center axis of a laser radiation direction, according to an embodiment of the present invention.

FIG. 9 illustrates the aligning of a center axis of an image entry direction with a center axis of a laser radiation direction, according to an embodiment of the present invention, in which the position of an image input unit 210 may vary according to the placement angle 900 of a half mirror 700.

That is to say, where the placement angle 900 of the half mirror 700 is at 45 degrees in a direction in which a laser is radiated from a laser generating unit 310 to a reflection mirror 512, the direction of the laser radiated from the generating unit 310 to the half mirror 700 may be orthogonal to the image entry direction of the image input from the half mirror 700 to the image input unit 210. In other words, the laser generating unit 310 and the image input unit 210 may be structurally separated from each other, which may unduly increase the physical size of the motion tracking system 200.

Accordingly, in an embodiment, in consideration of transmissivity and reflectivity of the half mirror 700, the placement angle 900 of the half mirror 700 may advantageously be made as small as possible, thereby ensuring that a distance between the laser generating unit 310 and the image input unit 210 is as small as possible.

In addition, the placement angle 900 of the half mirror 700 may be set to 45 degrees or greater, thereby increasing the transmissivity of the laser or increasing the reflectivity of the input image.

Figure 10:
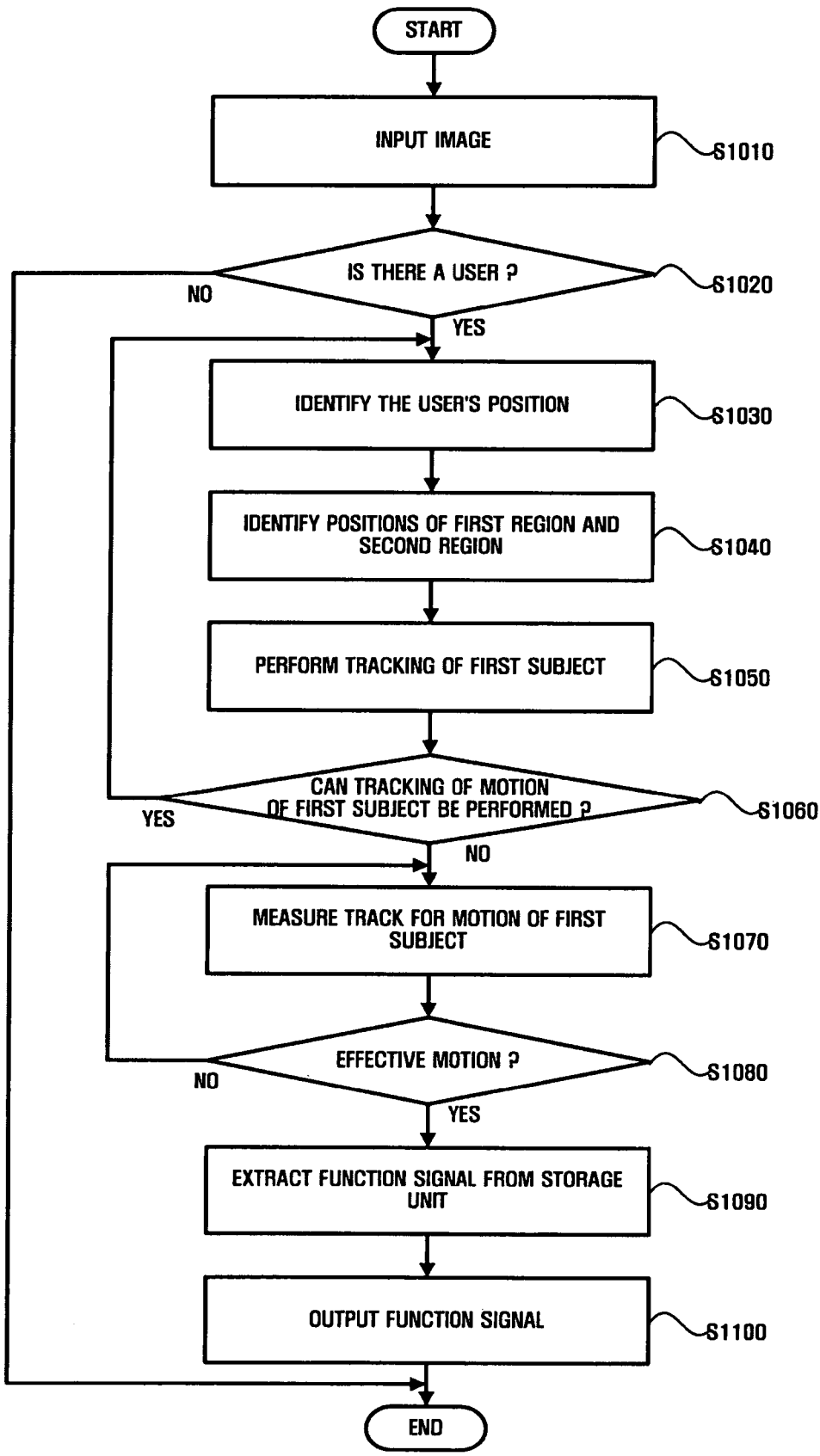
FIG. 10 illustrates a method of recognizing a user's motion, according to an embodiment of the present invention.

FIG. 10 illustrates a method of recognizing a user's motion, according to an embodiment of the present invention.

In order to recognize a user's motion, an image may be input in operation S1010, e.g., by the image input unit 210 of the motion tracking system 200. The input image may be an analog image, which may then be converted into a digital image and transferred, e.g., to a control unit 230.

After inputting the digital image, it may be determined whether the image includes a target to be tracked, for example, a user, in operation S1020. A plurality of users or only a part of the body of a single user may be included in the input image. Alternatively, no user may be included in the input image. It may be determined whether there is a user to be tracked as a target, e.g., by the control unit 230.

In an embodiment, if there is a user to be tracked as a target among the plurality of users, or if a body part of the effective user is recognizable, the position identifying unit 240 may be controlled to identify the user's position in operation S1030. Here, a determination of whether a target user exists or user recognition based on a user's body part may be performed through edge detection, pattern recognition, or the like, which need not be described in greater detail herein.

The user's position may be identified, e.g., according to the control command of the control unit 230. In operation S1040, positions of the first region 110 and second region 120 may be identified.

The position of the first region 110 may be roughly identified as an incident image, e.g., an image incident on the image input unit 210. In order to make the center axis 610 and the center axis 620 coincide with each other, the motion tracking system 200 may include the half mirror 700, which has been described with reference to FIG. 7 and for which greater detail will not be provided here.

In order to identify the position of the second region 120, the IR generating unit 250 may perform irradiation using IF radiation, for example. The IF radiation may be reflected by the second subject 112 positioned in the second region 120 and the reflected IF radiation may be re-reflected, e.g., by the reflection mirrors 511 and 512 and half mirror 700 provided in the path changing unit 320 to then be input to image input unit 210. Here, the second subject 112 may include, for example, a user's eye.

Accordingly the position of the IF radiation included in the image may be identified, e.g., by the position identifying unit 240, thereby identifying the position of the second region 120. Here, in order to receive the IF radiation reflected by the second subject 112, the image input unit 210 may include an IR filter 800.

The identified positions of the first region 110 and second region 120 may be transferred to the target tracking unit 220, and the target tracking unit 220 may perform tracking of the first subject 111 located in the first region 110 in operation S1050.

The tracking result may be continuously sent to the control unit 230, e.g., by the target tracking unit 220. It may be determined whether the tracking may be performed in operation S1060. If the tracking cannot be performed, the position identifying unit 240 may be controlled to resume the identifying task of the user's position and the positions of the first region 110 and the second region 120 in operation S1030.

If the tracking is continuously performed, the track of a motion of the first subject 111 may be measured, in operation S1070, e.g., by the target tracking unit 220, and the measured track may be transferred, e.g., to the control unit 230.

The measured track may be transferred, e.g., to the motion recognizing unit 260, and it may be determined whether the track is an effective motion, or not, in operation S1080. That is to say, characteristics of the transferred track may be analyzed and compared with a stored motion code, e.g., motion code stored in the storage unit 280, to check whether the analyzed track characteristics correspond to the stored motion code. If yes, a function signal corresponding to the stored motion code may be extracted, e.g., by the motion recognizing unit 260, in operation S1090 and the function signal may be transferred, e.g., to the control unit 230.

Then, the function signals may be output in operation S1100, e.g., by the signal outputting unit 270. The outputted signals may be transferred, e.g., to the function executing system 150. Accordingly, corresponding functions may be executed.

Figure 11:
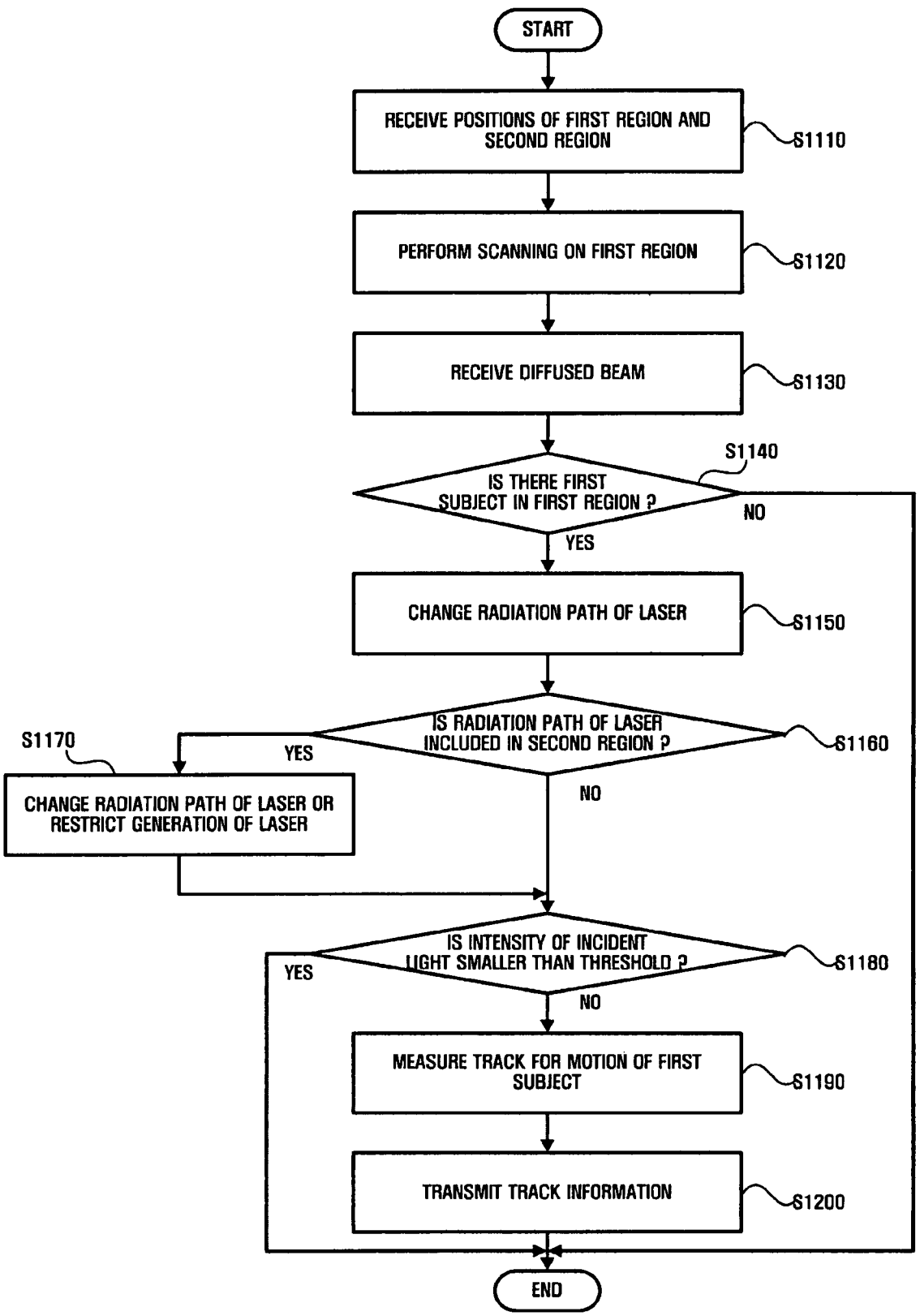
FIG. 11 illustrates that a first subject is tracked, according to an embodiment of the present invention.

FIG. 11 illustrates that a first subject 111 may be tracked, according to an embodiment of the present invention.

In order to track the first subject 111, the positions of the first region 110 and the second region 120 may be received, e.g., by the laser controller 330 of the target tracking unit 220 from the control unit 230, in operation S1110.

A laser may be generated, e.g., by the laser controller 330 controlling the laser generating unit 310 and scanning may be performed, e.g., by the path changing unit 320, in operation S1120. That is to say, the laser may be sequentially scanned on an entire surface of the first region 110 by changing the placement angle of the reflection mirrors 511 and 512 provided in the path changing unit 320. The radiated laser may be reflected by a target located in the first region 110 and diffused beams may be received in operation S1130.

The received beams may be transmitted, e.g., to the laser controller 330. The intensity and shape of the light may be analyzed and whether the first subject 111 is located in the first region 110 may be determined in operation S1140. Here, where there is an overlapping area between the first region 110 and the second region 120, the path changing unit 320 may be directed not to perform scanning on the overlapping area.

As a scanning result, when the first subject 111 is located in the first region 110, the radiation path of the laser may be changed so as to continuously radiate the laser to the first subject 111 in operation S1150. That is to say, it may be determined whether the first subject 111 has moved by referring to the intensity and shape of incident light, e.g., light incident on the light receiving unit 340. The placement angle of the refraction mirrors 511 and 512 may be adjusted according to the determination result.

Here, continuous checks may be performed, e.g., by the laser controller 330, to determine whether the changed radiation path of the laser is included in the second region 120 in operation S1160. If the changed radiation path of the laser is included in the second region 120, the path changing unit 320 may be controlled to change the radiation path of the laser so that the changed radiation path may not be included in the second region 120. Alternatively, the laser generating unit 310 may be controlled to interrupt generation of a laser in operation S1170.

In addition, the laser controller 330 may continuously check whether intensities of diffused beams incident on the light receiving unit 340 are less than a predetermined threshold in operation S1180, and if so, may transmit the result to the control unit 230 and stop tracking.

The intensities and shapes of the diffused beams incident on the light receiving unit 340, and the radiation path of the laser changed by the path changing unit 320 may be transferred, e.g., to the track measuring unit 350. A track may be measured for motion of the first subject 111 on a 3D space by referring to the received information in operation S1190.

The measured track information may be transferred, e.g., to the laser controller 330, and the laser controller 330 may transfer the same to the control unit 230 in operation S1200.

The motion tracking system, method and medium, according to one or more embodiments of the present invention provide at least the following advantages.

First, in order to radiate a laser based on an incident image, a center axis of an image entry direction may be aligned with a center axis of a laser radiation direction, thereby radiating the laser to a spot where a subject is actually located.

Second, user safety may be enhanced because laser radiation to a body part that is sensitive to light, e.g., a user's eyes, may be avoided using an IF transmitter and an IR filter.

In addition to the above described embodiments, embodiments of the present invention may also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A motion tracking system comprising:
    a half mirror to reflect a predetermined amount of incident light and to transmit a remaining amount of the incident light;
    an image input unit to input an image reflected from the half mirror;
    a position identifying unit to identify a position of a first subject and a second subject, each of which is included in the input image; and
    a target tracking unit to track the first subject with reference to the identified position by radiating a laser transmitted through the half mirror onto the first subject along an axis from the half mirror and onto the first subject.

2. The motion tracking system of claim 1, wherein the position identifying unit identifies the position of the first subject through image processing.

3. The motion tracking system of claim 1, wherein the target tracking unit comprises:
at least one of a laser generating unit to generate the laser;
a laser controller to identify the position of the first subject located in a particular region of the image by scanning with the laser;
a path changing unit to change a radiation path of the laser so that the laser is radiated onto the first subject;
a light receiving unit to receive diffused beams of the laser radiated onto the first subject; and
a track measuring unit to measure the track of a motion of the first subject by referring to an intensity of the received light and the changed radiation path.

4. The motion tracking system of claim 1, wherein the position identifying unit identifies the position of the second subject included in the input image so as to avoid radiation of the second subject set with the laser.

5. The motion tracking system of claim 4, wherein the position identifying unit identifies the position of the second subject by performing image processing on the input image.

6. The motion tracking system of claim 4, further comprising an infrared (IF) generating unit to generate IF radiation.

7. The motion tracking system of claim 6, wherein the position identifying unit identifies the position of the second subject by which the generated IF radiation is reflected, by referring to a position of the received IF radiation.

8. The motion tracking system of claim 7, wherein the position identifying unit identifies the position of the second subject by which the generated IF radiation is reflected, by referring to the position of the IF radiation received through a predetermined IR filter.

9. The motion tracking system of claim 4, wherein the laser controller controls a radiation path of the laser so as to prevent the laser from being radiated onto a predetermined region around the second subject by referring to the received IF radiation.

10. The motion tracking system of claim 4, wherein when the laser is radiated into a predetermined region around the second subject, the laser controller restricts generation of the laser by referring to the received laser.

11. The motion tracking system of claim 3, further comprising a motion recognizing unit recognizing the motion of the first subject using the measured motion track.

12. The motion tracking system of claim 1, wherein the position of the image input unit varies according to the angle of the half mirror.

13. A motion tracking method comprising:
receiving an input image reflected from a predetermined half mirror, which reflects a predetermined amount of incident light and transmits a remaining amount of the incident light;
identifying a position of a first subject and a second subject, each of which is included in the input image; and
tracking the first subject with reference to the identified position by radiating a laser transmitted through the half mirror onto the first subject along an axis from the half mirror and onto the first subject.

14. The motion tracking method of claim 13, wherein the identifying of the position comprises identifying the position of a first subject through image processing.

15. The motion tracking method of claim 13, wherein the tracking comprises:
generating the laser;
identifying the position of the first subject located in a particular region of the image by scanning with the laser;
changing a radiation path of the laser so that the laser is radiated onto the first subject;
receiving diffused beams of the laser radiated onto the first subject; and
measuring the track of a motion of the first subject by referring to an intensity of the received light and the changed radiation path.

16. The motion tracking method of claim 13, further comprising identifying the position of the second subject included in the input image so as to avoid radiation of the second subject set with the laser.

17. The motion tracking method of claim 16, wherein the identifying of the second subject's position comprises identifying the position of the second subject by performing image processing on the input image.

18. The motion tracking method of claim 16, further comprising radiating IF radiation onto the second subject.

19. The motion tracking method of claim 18, wherein the identifying of the second subject's position comprises identifying a position of the second subject reflecting the generated IF radiation by referring to the position of the IF radiation received after being reflected.

20. The motion tracking method of claim 19, wherein the identifying of the second subject's position comprises identifying the position of the second subject reflecting the generated IF radiation, by referring to the position of the IF radiation received through a predetermined IR filter.

21. The motion tracking method of claim 16, further comprising controlling a radiation path of the laser so as to prevent the laser from being radiated onto a predetermined region around the second subject by referring to the received IF radiation.

22. The motion tracking method of claim 16, when the laser is radiated into a predetermined region around the second subject, further comprising restricting generation of the laser by referring to the received laser.

23. The motion tracking method of claim 15, further comprising recognizing the motion of the first subject using the measured track.

24. The motion tracking method of claim 13, wherein the position of the image input unit varies according to the angle of the half mirror.

25. At least one medium comprising computer readable code to control at least one processing element to implement the method of claim 13.

26. A motion tracking system including a half mirror, and an image input unit to input an image reflected from the half mirror, the system comprising:
a position identifying unit to identify a first region and a second region included in the input image; and
a target tracking unit to track a first subject located within the first region by radiating a laser transmitted through the half mirror while changing an output of the laser when the laser falls within the second region.

* * * * *